United States Patent

[11] 3,628,954

[72] Inventor Jean J. A. Robillard
Zumikon, Zurich, Switzerland
[21] Appl. No. 20,465
[22] Filed Mar. 24, 1970
[45] Patented Dec. 21, 1971
[73] Assignee Keuffel and Esser Company
Morristown, N.J.
Continuation of application Ser. No. 553,151, May 26, 1966, now abandoned. This application Mar. 24, 1970, Ser. No. 20,465

[54] DIAZO MATERIAL AND VISIBLE LIGHT DEVELOPMENT PROCESS THEREFORE
7 Claims, 2 Drawing Figs.

[52] U.S. Cl. 96/49, 96/1.7, 96/1.8, 96/75, 96/91
[51] Int. Cl. G03c 5/34, G03c 5/18, G03c 1/62
[50] Field of Search 96/49, 75, 91, 1, 1.2, 1.7, 1.8, 64; 250/65.1, 65.2

[56] References Cited

UNITED STATES PATENTS

| | | | |
|---|---|---|---|
| 2,657,140 | 10/1953 | Kessels | 96/49 |
| 3,069,365 | 12/1962 | Shely | 96/1.7 X |
| 2,205,991 | 6/1940 | Neugebauer et al. | 96/49 |
| 2,551,133 | 5/1951 | Jennings | 96/91 X |
| 2,657,141 | 10/1953 | Kessels | 96/91 X |
| 2,939,787 | 6/1960 | Giamo | 96/36.2 X |
| 3,113,022 | 12/1963 | Cassiers et al. | 96/91 X |
| 3,227,076 | 1/1966 | Castle | 96/1 X |
| 3,285,741 | 11/1966 | Gesierich | 96/1 |
| 3,228,769 | 1/1966 | Workman | 96/91 X |
| 3,353,984 | 11/1967 | Landau | 96/91 X |
| 3,360,371 | 12/1967 | Munder | 96/49 X |

FOREIGN PATENTS

| | | | |
|---|---|---|---|
| 1,032,508 | 6/1966 | Great Britain | 96/75 |

OTHER REFERENCES

Kosar, J., " Light Sensitive Systems," 1965, p. 198 relied on.

*Primary Examiner*—Charles L. Bowers, Jr.
*Attorneys*—J. Russell Juten, Peter F. Willig, Lionel N. White and Milford A. Juten

ABSTRACT: A dry diazo reproduction process for making positive diazo-type copies is described. The process comprises exposing an image pattern and a diazo sheet material containing a diazo compound, an azo coupler, a semiconductor pigment, preferably sensitized with an organic dye, and a compound which causes upon reduction a shift in pH in the basic region in the diazo sheet material to a UV radiation source and thereafter developing the diazo sheet by exposure to radiation of a different wavelength than used in the exposure step. In addition, the diazo sheet material used in the process is also described.

INVENTOR.
JEAN J. A. ROBILLARD
BY
ATTORNEYS

DIAZO MATERIAL AND VISIBLE LIGHT DEVELOPMENT PROCESS THEREFORE

This application is a continuation of Application Ser. No. 553,151, now abandoned, filed May 26, 1966.

The present invention relates to a new diazo reproduction process for making positive diazo-type copies employing a dry development technique and to a radiation-sensitive diazo-type paper suitable for carrying out the process of the present invention.

More particularly, the present invention is concerned with a diazo reproduction process employing radiation of a different wavelength for the development of the image than used to decompose the diazonium compound in the diazo-type paper.

It is known that the conventional diazo process is based on the decomposition of a diazonium salt under an intense UV light followed by the development of the unexposed diazonium salt, which involves a coupling reaction with a coupler(s) existing in the sensitive emulsion. The development is produced by a shift in pH created by exposure of the material to ammonia vapors. The use of ammonia vapors presents obvious inconveniences. A recent improvement of the diazo-type process makes use of the thermal decomposition of a compound to produce ammonia in the diazo paper itself; however, this type of paper leaves much to be desired because thermal diazos are known to be unstable during storage or handling.

Accordingly, it is an object of the present invention to provide a diazo-type reproduction process which avoids the use of ammonia or other volatile chemicals in the development of the image to be reproduced.

Another object of the present invention is to provide a diazo-type reproduction process involving a dry development technique.

A further object of the present invention is to provide a radiation-sensitive diazo-type sheet material suitable for carrying out the process of the present invention.

Yet another object of the present invention is to provide a diazo-type process wherein the development of a positive image of the original is achieved by exposing the diazo sheet material of the present invention to a radiation source of different wavelength than that employed to decompose the diazo compound in said diazo sheet material.

Figure 1:
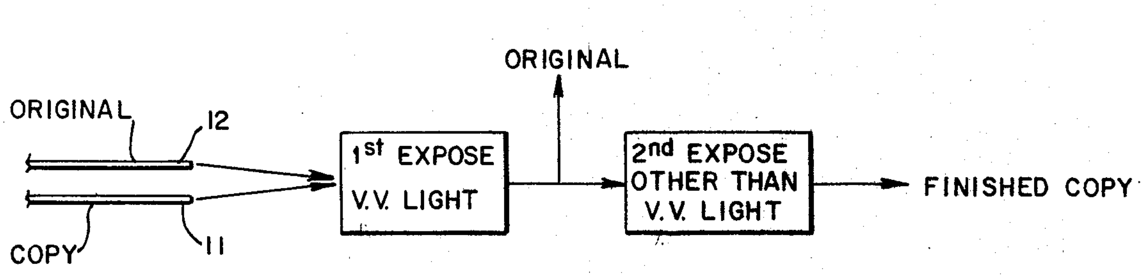
Figure 2:
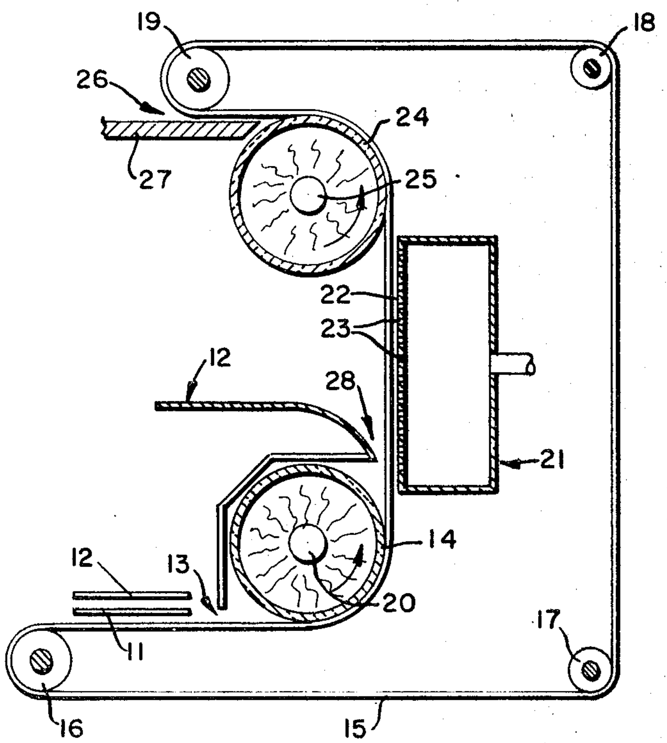

These and other objects and advantages of the present invention will become apparent from the following detailed description, when taken in conjunction with the appended drawing, wherein:

FIG. 1 is a flow diagram illustrating the steps of the process of the present invention; and FIG. 2 is a schematic diagram of an apparatus suitable for carrying out the process of the present invention.

According to the present invention a shift in pH toward the basic region takes place in the diazo paper which will trigger the coupling reaction of one or more couplers with the diazo compound unexposed to UV radiation. The shift in PH is promoted by the reduction of a suitable compound in the diazo sheet material, which undergoes a shift in pH upon reduction, initiated by the photodesorption of a semiconductor pigment in the diazo paper.

Typical semiconductor pigments which exhibit this photodesorption property include zinc oxide and cadmium sulfide. The mechanism involved is intimately related to the photoconductive properties of the semiconductor material. The mechanism of photoconductivity in zinc oxide and cadmium sulfide is quite different from common photoconductors, as it involves an oxygen adsorption-desorption phenomenon which influences substantially the photoconductive characteristics of the material.

The oxygen adsorption-desorption phenomenon will be explained in connection with zinc oxide. According to an accepted theory, the photoconductivity in zinc oxide is initiated by the formation of an electron-hole pair under the absorption of a quantum of light. The holes formed in the blocking layer migrate toward the surface of the zinc oxide lattice under the influence of an electric field, and when it reaches the surface, it recombines with an ionized $0^-$ (chemisorbed oxygen), converting it into physically absorbed O. Part of the photoconductivity can also be due to the collision of a photon with a chemisorbed atom of oxygen. The adsorption sites for oxygen are generally made of excess interstitial zinc in the zinc oxide lattice. When light is absorbed, oxygen is released from these sites due to the recombination of the holes with the trapped ions, as indicated before. If the light excitation ceases, oxygen will be readsorbed from the free sites and an electron from each site will be exchanged with the interstitial zinc responsible for the site. The adsorption decreases the conductance of the oxide and produces a heavier layer of oxygen ions $O^-$.

As part of the mechanism described above, the oxidation-reduction photochemical reactions, and especially reductions, can be induced by zinc oxide through electron shift from oxygen to zinc on the surface regions of the zinc oxide crystals. The first reaction is:

$$Zn^{++}O^{--} \xrightarrow{light} Zn^{+}O^{-}$$

This being unstable would revert to its original form. The missing electron of the oxygen is replaced by some irreversible process such as:

$$Zn^{+}O^{-}H_2O \rightarrow Z^{+}O^{--}+H_2O^{+}$$
$$H_2O^{+} \rightarrow H^{+}+OH$$
$$OH+(additive) \rightarrow CO_2+H_2O$$

The $Zn^+$ will act as reducing agent and a latent image reduction potential will exist. The $Zn^+$ will transfer an electron to a reducible material.

The above described mechanism reveals that zinc oxide possesses photochemical properties in the visible region of the electromagnetic spectrum.

In the diazo process of the present invention use of the reduction capability of $Zn^+$ is made to induce a reaction in the diazo paper producing a shift in pH toward the basic region. Materials which have been found particular suitable for reduction by the $Zn^+$ include salts of aliphatic acids or hydroxides. Specific examples are zinc hydroxide, aluminum acetate and sodium oxalate, etc. The reduction of any one of these materials by $Zn^+$ produces a relatively large change in pH during the reduction reaction, a result highly desirable in the process of the present invention. Other materials which will undergo a substantial change in pH toward the basic region can be suitably employed in the diazo composition of the present invention.

As illustrated by FIG. 1, the process of the present invention is carried out as follows: The original to be reproduced and the diazo-type paper are first exposed to UV light which will trigger the decomposition of the diazo compound in those portions exposed to UV light. Following exposure to UV light, development is accomplished by exposure of the diazo paper to radiation of a wavelength different than that of UV light, e.g., in the visible range. This exposure will result in the photodesorption of the semiconductor pigment in the diazopaper which will induce a reaction producing a shift in pH toward the basic region as described above. This shift in pH is promoted by the reduction of a hydroxide such as zinc hydroxide or metal salt of an aliphatic acid such as aluminum acetate or sodium oxalate present in the diazo material. As a result a positive reproduction of the original is obtained.

The spectral region in which the development can take place can be influenced by dye sensitization of the semiconductor pigment. It is well known that properties such as photoconductivity and also desorption can be substantially affected by dye sensitization. The purpose of the dye sensitization is not only to increase the radiation sensitivity of the semiconductor pigment, but also to bring the sensitivity into a region of the spectrum that will match the light source employed in the development step. The dye sensitization of zinc oxide is illustrated in U.S. Pat. No. 3,069,365. The sensitizing should be made in the dark and the semiconductor pigment to be sensitized should be kept in the dark for at last 24 hours prior to sensitization.

THe sensitizer for the semiconductor pigment such as zinc oxide or cadmium sulfide is made of an organic dye such as acridine dyes, xanthrene dyes, diphenylmethane dyes, triphenylmethane dyes, stilbene dyes, thiazole dyes, quinoline dyes, azo dyes, etc., in a partial solvent media. The partial solvent media consists of an organic liquid capable of dissolving only between about $10^{-2}$ and about $10^{-6}$ moles of the dye per liter at 20° C. and having a dielectric constant between 5 and 18. Among the solvents which fit this definition are ethyl acetate, methyl acetate, methylethyl ketone, ethyl alcohol, methyl alcohol, butyl alcohol, chloroform, ethyl ether, toluene, butyl acetate, propyl acetate, acetone, carbon tetrachloride, heptane, benzene, xylene, etc.

Specific dyes suitable for sensitizing the semiconductor pigment include Phosphine R (46045), Eosin (45380), Erythrosin (45430), Rose Bengal (45435), Auramine (41000), Primuline (49000), Calcozine Violet C (42555), Stilbene Yellow G (40000), Diphenyl Fast Orange 4RL (40265), Setoflavine T (49005), Calcocid Yellow G (41005), Calconine Chinoline Yellow P (47035), Sulfogene Bordeau (53720), Azo Scarlet Y (17755), Erio Chrome Cyanine R (42571) and Diazophenyl Fast Scarlet GI (17805). The dye identification numbers are taken from the second volume of the Color Index (1956). In general, the sensitivity of the semiconductor material is brought into a region of the spectrum that will match the radiation source used for development by employing a combination of several dyes which gives a larger absorption band. However, a single dye can also be employed.

The diazo compounds suitable for use in the present invention include any of the usual light-sensitive diazo compounds known in the art. The diazo compounds may be used as such or in the form of their stabilized double salts such as a diazonium zinc chloride, cadmium chloride or stannous chloride double salt.

Representative of specific diazo compounds that may be employed in the present invention include 1-diazo-4-diethylaminobenzene, 1-diazo-4-dimethylamino-benzene, 1-diazo-2,5 diethoxybenzoylaminobenzene, 1-diazo-2,5, dibutoxybenzoylaminobenzene, 1-diazo-4-tolylmercapto-2,5, diethoxybenzene, 1-diazo-2,5-dimethoxy-1-p-tolylmercaptobenzene, 1-diazo-4-dihydroxypropylaminobenzene, 1-diazo-3-methyl-4-dimethylaminobenzene, 1-diazo-2-carboxy-4-dimethylaminobenzene, 1-diazo-3-ethoxy-4-diethylaminobenzene, 1-diazo-4-(N-hydroxyethyl-N-methyl)aminobenzene, 1-diazo 4-n-propylamino-3-n-propoxybenzene,p-diazo-diphenylamine,1-diazo-2 chloro-4-(dihydroxyethyl)aminobenzene.

Representative aromatic diazo compounds that may be employed in the process of the present invention include compounds of the following formula:

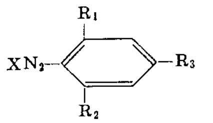

X represents an anion $R_1$ and $R_2$ are the same or different and represent H, alkyl, alkoxy, alkylmercapto, aryl, aralkyl, halo, carboxy and aryloxy groups;

$R_3$ represents

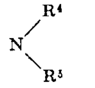

O—$R_6$, S—$R_6$ and diarylamino groups;

$R_4$ and $R_5$ are the same or different and represent hydrogen alkyl, aryl, aryloxy, hydroxyalkyl, aralkyl, alkylacyl and aroyl groups; $R_6$ represents alkyl, aryl, aralkyl, and alkaryl.

The diazo composition of the present invention includes any of the usual couplers well known in the art such as, for example, phloroglucinol, o-hydroxydiphenyl, 1-hydroxynapthalene, 1,5 dihydroxynapthalene, cyanacetanilide, 4-(acetoacetamido)benzene sulfonamide, resorcinol monoacetate, 3,5-dihydroxytoluene, 1,5-dihydroxy-2-methylbenzene p-methyl-N-phenyl pyrozalone, 2,5 xylenol, acetyl acetanilide, 3-methyl-5-pyrozalone, 2,3 dihydroxynapthalene thiobarbituric acid, 1,3,5-trihydroxy-2-methylbenzene, 1-acetylamino-2-naphtol-5-sulfonic acid. A list of other suitable couplers may be found in the article by Van de Griten, Photographic Journal, volume 92B, (1952).

The diazo composition of the present invention may contain in addition to the diazo compound, the coupling agent(s) and the compound to be reduced, e.g., zinc hydroxide, aluminum acetate, or sodium oxalate the usual adjuncts. For example, a hygroscopic agent such as glycerine ethylene glycol or dextrin can be suitably employed in the diazo composition. There may also be included stabilizing agents such as thiourea and its derivatives napthalene, trisulfonic acid, and the like, to prevent darkening of phenolic residues. Also included in the diazo composition is a stabilizing acid for retarding premature coupling such as citric acid, boric acid or tartaric acid. Additional adjuncts that may be in the composition include a spreading agent such as Saponin; gelatin which provides an ionic medium for the coupling reaction and functions as a vehicle for the other ingredients in the diazo composition; and a metal salt for intensification of the image such as zinc chloride, nickel sulfate, aluminum sulfate or titanium ammonium fluoride.

The base material upon which the light-sensitive diazo-type composition is coated may be a sheet film or web forming material such as cotton, linen, paper, etc. Any suitable coating process may be utilized. For example, a conventional knife-coating machine may be used to coat the layer of the material onto a base. The coating can also be performed with other usual methods such as wiring rod, kiss coating, air knife, etc.

The procedure for preparing the diazo-type base material of the present invention is as follows: The semiconductor pigment to be used in the process, e.g., zinc oxide or cadmium sulfide is wetted with a solvent such as toluene, methyl ethyl ketone, or alkanols such as absolute ethanol. However, other conventional solvents may be employed. To this admixture there is added an organic binder under agitation. The proportion of semiconductor pigment to binder is not critical but a ratio of about 5:1 gives best results. The mixture of the semiconductor pigment, solvent and binder are agitated in a high speed mixer for about 10 minutes. Examples of suitable binders include Pliolite S-7 (a 30:70 mole ratio butadiene-styrene copolymer supplied by Goodyear Tire & Rubber Co.), CYZAC XMR 1526 (a modified polyester resin supplied by American Cyanamid Co.), Zytel (resin composed of alcohol-soluble polyamides, available from Du Pont Chemical Company).

After agitation in the high-speed mixer the semiconductor pigment which has been uniformly dispersed in the organic binder is kept in the dark for at least 24 hours and then sensitized in the dark by adding a suitable dye solution to the pigment. A typical dye solution which leads to a white paper comprises Clayton Yellow, Methylene Blue, and Rose Bengal.

After the semiconductor pigment has been prepared with a desired binder and sensitized, the composition is coated on a suitable base material and dried. The base material is then sensitized with a diazo composition comprising the selected diazo compound or corresponding diazonium salt, the coupling agent(s), the compound to be reduced, e.g., zinc hydroxide, sodium oxalate or aluminum acetate, and the usual adjuncts. This coating is dried.

SPecific but nonlimiting examples of the diazo compositions useful in the process of the present invention are as follows:

EXAMPLE 1

White base paper of 80 g./m.$^2$ is treated with a composition comprising:

| | |
|---|---|
| ZnO (Photox 801—available for N.J. Zinc Co.) | 100 g. |
| Pliolite S-7 (7% solution) | 83 cc. |
| Toluene | 100 cc. |
| Dye-Sensitizing solution | 5 cc. |

The dye-sensitizing solution is:

25 cc. Clayton Yellow 0.1% solution in methanol
10 cc. Methylene Blue 0.1% solution in methanol
10 cc. Rose Bengal 0.1% solution in methanol The base paper is dried and then given a diazo coat comprising:

| | |
|---|---|
| water | 150 ml. |
| glycerine | 11.4 g. |
| sodium oxalate | 5.2 g. |
| Thiourea | 37.5 g. |
| Zinc Chloride | 15.0 g. |
| Gelatine | 20.0 g. |
| Phloroglucinol | 2.1 g. |
| 2,3 dihydroxynapthalene | 5.7 g. |
| Zinc chloride double salt of 1-diazo-4-diethylaminobenzene | 5.1 g. |
| Citric acid | 6.0 g. |
| Saponin | 0.25 g. |

EXAMPLE 2

White base paper of 80 g./m.$^2$ is treated with a composition comprising:

| | |
|---|---|
| ZnO (Photox 801) | 100 g. |
| CYZAC XMR 1526 | 40 g. |
| Toluene | 100 cc. |
| Dye-Sensitizing Solution | 5 cc. |

The dye solution is:

25 cc. Clayton Yellow Solution 0.1% methanol
10 cc. Methylene Blue Solution 0.1% methanol
4 cc. Rose Bengal Solution 0.1% methanol The base paper was then treated with the diazo coat described in example 1.

The diazo process of the present invention can be carried out in a conventional diazo machine where the development tank has been removed and replaced by a radiation source, e.g., in the visible range. Even this radiation source for development is not essential because development can be achieved by exposure of the diazo paper to ordinary light.

The diazo-type process of the present invention may be utilized in an apparatus such as that illustrated in FIG. 2, for example.

In FIG. 2, the photocopy apparatus comprises an elongated opening 13 that receives the diazo paper 11 and the original 12 to be reproduced. The original 12 and diazo paper 11 are arranged in an overlying relationship. The sheets 11 and 12 are inserted in the opening 13 and are drawn underneath the exposure roller 14 by endless transfer belt 15 which is carried by rollers 16, 17, 18, and 19. The exposure roller 14 furnishes the light to decompose the diazo compound in the areas of the diazo paper 11 overlaid by the opaque portions of the original 12. The exposure roller 14 may be formed of a plastic cylinder or light-transmitting glass within which there is positioned a mercury illumination tube 20.

After the original 12 and diazo paper 11 have passed underneath exposure roller 14, the original 12 is separated from the diazo paper by use of a chamber 21 which is under subatmospheric pressure by virtue of its communication with a vacuum pump (not shown). The front wall 22 of chamber 21 is provided with apertures 23. Accordingly, as the diazo paper 11 moves upwardly in overlying relationship with the front wall 22 of chamber 23, it will adhere thereto under the influence of subatmospheric pressure, this subatmosphere being communicated to the rear surface of the diazo paper 11 by means of apertures 23 and the transfer belt 15 which is porous. The subatmosphere is blocked from the original 12 because of the impervious nature of the diazo paper 11 and hence diazo paper 11 will separate from the original 12. The original 12 is removed from the photocopy apparatus at point 28.

After the diazo paper 11 is separated from the original, it passes beneath development roller 24 which may be constructed in a similar manner to exposure roller 14. Within development roller 24 there is positioned a fluorescent light tube 25. Finally the transfer belt 15 carries the diazo paper 11 after development of the image to opening 26 from which said sheet emerges onto receiving platform 27.

Other variations and embodiments will be apparent to those of skill in the art, and it is accordingly desired that the scope of the invention not be limited to those embodiments particularly illustrated or suggested but that the scope of the invention be defined by reference to the appended claims.

What is claimed is:

1. A diazo sheet material comprising a supporting base having a first coating thereon containing a semiconductor pigment selected from the class consisting of zinc oxide and cadmium sulfide, said pigment being sensitized with at least one organic dye which sensitizes the pigment to visible light and said pigment being dispersed in an organic binder; and having a second coating over said first coating wherein said second coating contains a light-sensitive diazonium compound, at least one azo coupler, an acidic stabilizer, and a compound which causes, upon reduction, a shift in pH toward the basic region in said diazo material, said compound to be reduced being selected from the class consisting of metal hydroxides and metal salts of an aliphatic acids.

2. A diazo sheet material according to claim 1 wherein said compound to be reduced is sodium oxalate.

3. A diazo sheet material according to claim 1 wherein said compound to be reduced is aluminum acetate.

4. A diazo-type paper according to claim 1 wherein said semiconductor pigment is sensitized with a combination of dyes in a partial organic solvent media.

5. A diazo-type paper according to claim 1 wherein the semiconductor pigment is zinc oxide.

6. A diazo sheet material according to claim 1 wherein said semiconductor pigment is cadmium sulfide.

7. A process for producing a visible reproduction in a diazo sheet material which comprises imagewise exposing a diazo sheet material as described in claim 10 to a radiation source of UV wavelength to decompose the diazonium salt in the exposed areas of said diazo sheet material and exposing said diazo sheet material to a radiation source of visible light to develop a positive azo dye image in said diazo sheet material by having said semiconductor pigment undergo photodesorption which reduces the said compound to be reduced and results in a shift in the pH toward the basic region in said diazo sheet material enabling coupling to form an image in said diazo sheet material.

* * * * *